Jan. 18, 1938.

J. W. MacCLATCHIE

Re. 20,631

BLOW-OUT PREVENTER

Original Filed Feb. 8, 1932

INVENTOR.
John W. MacClatchie,
BY
R. W. Smith
ATTORNEY.

Reissued Jan. 18, 1938

Re. 20,631

UNITED STATES PATENT OFFICE 20,631

BLOW-OUT PREVENTER

John W. MacClatchie, Los Angeles, Calif., assignor to MacClatchie Manufacturing Company of California, Compton, Calif., a corporation of California Original No. 2,051,261, dated August 18, 1936, Serial No. 591,549, February 8, 1932. Application for reissue November 15, 1937, Serial No. 174,-728

12 Claims. (Cl. 255—1)

This invention is a blow-out preventer for well drilling apparatus; and has for its object to adjust the blow-out preventer which is normally positioned in the cellar beneath the derrick floor, without requiring the operator to leave the derrick floor and with said adjustment preferably including means for maintaining a tight pack-off when the blow-out preventer is in operative position and also including means for releasing its operative assembly when so desired.

More particularly it is an object of the invention to tighten the packing engagement of the blow-out preventer by means of pressure in the well casing, so that irrespective of variations in pressure, a tight pack-off may be automatically maintained between the blow-out preventer and the drill string which extends into the well casing, without requiring the operator to leave the derrick floor and enter the cellar for the purpose of tightening the packing.

It is a further object of the invention to retain the blow-out preventer in assembled relation by a simple but positive locking means which is adapted for remote control for readily releasing the locking means from the derrick floor and without requiring the operator to enter the cellar.

It is a still further object of the invention to incorporate the aforementioned features in a blow-out preventer which upon release of the locking means is adapted for unitary removal of a packer from a cooperating body which is mounted on the well casing, with the removable packer comprising a swivel structure having a stationary part adapted for reception in the body and a cooperating rotating part adapted to turn with the drill string.

Further objects of the invention will be readily understood from the following description of the accompanying drawing, in which.

Figure 1:
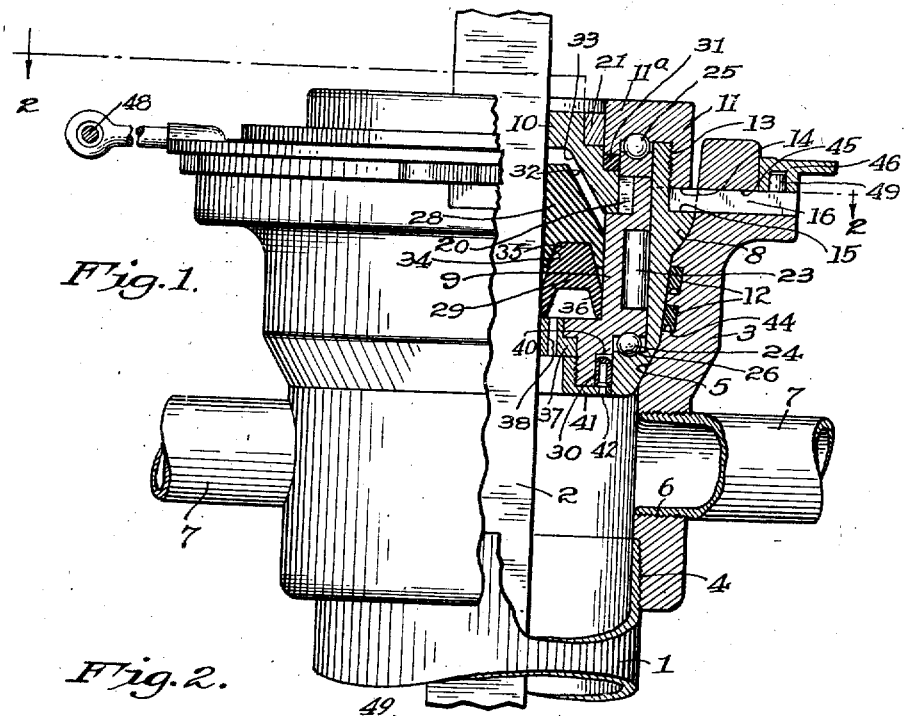
Fig. 1 is a side elevation of the blow-out preventer, partly in axial section.
Figure 2:
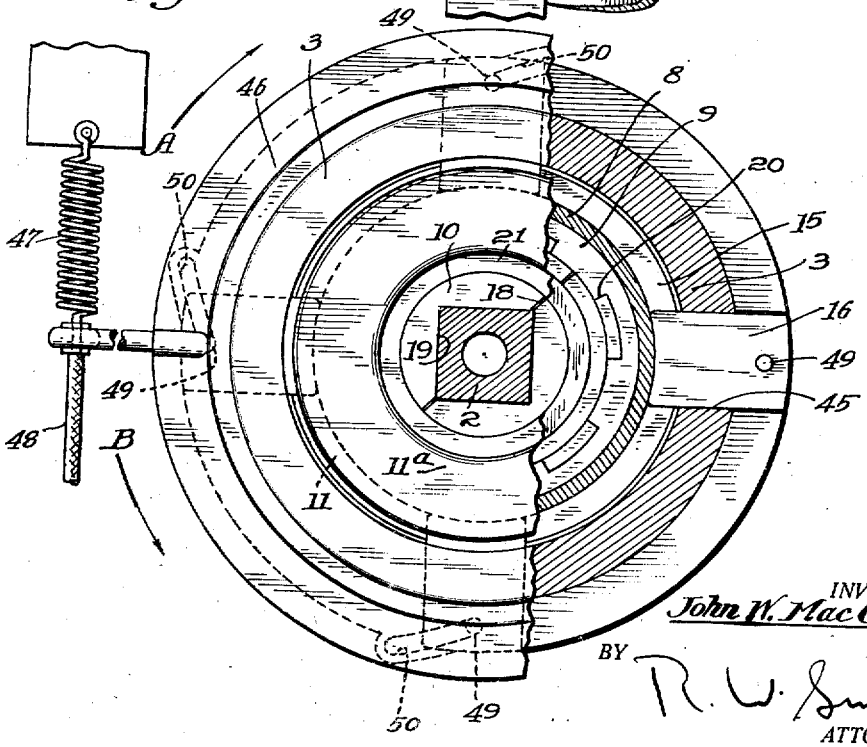
Fig. 2 is a transverse section on the line 2—2 of Fig. 1.

The blow-out preventer is adapted for mounting on the casing string 1 of a well structure, with the casing adapted to receive a drill string including a usual upwardly projecting and cross-sectionally polygonal kelly 2. The kelly is rotated in usual manner from the derrick floor (not shown), and the blow-out preventer is mounted on the casing in the usual cellar beneath the derrick floor.

The blow-out preventer includes a body 3 mounted on the well casing, and a cooperating packer received in the body and engaging the kelly 2 so as to pack-off between the well casing and the kelly. The body 3 may be threaded onto casing 1 as shown at 4, and has a tapering bore forming a seat 5 for the packer, with ports 6 below the tapering seat adapted for communication with usual laterally projecting discharge pipes 7.

The packer is releasably locked in body 3 and forms a swivel structure comprising a shell 8 non-rotatably mounted in the body and a cooperating rotating element 9 which is adapted to turn with kelly 2. Packing is provided between the kelly and the rotating element 9, and also between the rotating element and the stationary element 8. The rotating element is turned with the kelly by means of a driving element 10; and a flanged collar 11 maintains the packer elements 8, 9 and 10 in assembled relation so that the packer is removable as a unit from body 3, or by removing the flanged collar the rotating elements of the packer are adapted for displacement from the stationary element 8.

As an instance of this arrangement packing rings 12 are preferably mounted in the tapering bore 5 so as to pack-off between the removable packer and the body 3, and the flanged collar 11 is threaded onto the stationary element 8 of the packer as shown at 13. The collar 11 forms a shoulder 14 vertically spaced from a cooperating external shoulder 15 on the element 8, and locking elements 16 which are radially shiftable with relation to body 3 are adapted to releasably engage between the cooperating shoulders 14—15 for locking the packer in the body.

The rotating element 9 of the packer is journaled in the bore of the cooperating stationary element 8; and driving element 10 is preferably diametrically split as shown at 18 for ready reception on kelly 2, and has a polygonal bore 19 fitting the kelly 2 and an outer periphery fitting in the bore of element 9, with said outer periphery of element 10 and the bore of element 9 of conforming non-circular cross-section, e. g. a splined connection 20, so as to form a rotary driving connection between the elements 10—9. The split driving element 10 may be held in assembled relation by an integral collar 21, and the flange 11*a* of collar 11 overlies the splined engagement 20 so that elements 8, 9 and 10 of the packer form a unitary assembly.

Anti-frictional means are preferably provided between the relatively rotatable elements 8—9 of the packer. For this purpose a roller bearing 23 may be mounted in the outer peripheral surface of rotatable element 9, with ball bearings 24—25 preferably providing end thrust bearings for the rotatable element. The ball bearing 24 is mounted on a shoulder 26 of stationary element 8 and supports the rotatable element 9, and the ball bearing 25 is positioned between the flanged collar 11 and the driving connection 20.

The packing elements of the packer preferably include packing rings 28—29 between the rotatable element 9 and the kelly 2, a packing ring 30 between the rotatable element 9 and the stationary element 8, and a packing ring 31 between the collar 11 and the driving element 10.

As an instance of this arrangement the packing rings 28—29 are preferably superimposed, with the ring 28 having an upper tapering surface 32 adapted for wedging reception against a cooperating tapering seat 33 which is formed by the driving element 10, and the lower surface of packing ring 28 is preferably annularly grooved as shown at 34 for reception of a corresponding tongue 35 at the upper surface of packing ring 29. The lower surface of ring 29 is annularly grooved as shown at 36, and the cooperating packing rings 28—29 are held in assembled relation by a collar 37 which fits between the kelly 2 and the rotatable element 9, with ports 38 opening through the collar so that pressure in well casing 1 is communicated to the annular groove of the ring 29. The grooves 34 and 36 provide the packing 28 and 29 with inner peripheral packing lips having exterior contours conforming to the polygonal kelly 2 and with outer peripheral packing lips having exterior contours conforming to that of the bore of rotating element 9.

The packing 30 is preferably an inverted U-packing mounted in an annular recess 40 which is formed in the outer peripheral surface of element 9 below the ball bearing 24, and a gland 41 is threaded onto element 9 so as to retain packing 30 in place, and is ported as shown at 42 so that the pressure in casing 1 is communicated to the channel of the U-packing. The gland 41 also holds collar 37 in place, but without obstructing its ports 38.

It will thus be seen that the packing requires no manual adjustment, but is automatically expanded in accordance with the pressure in the well casing so as to maintain a tight seal whatever the casing pressure may be. For example the casing pressure directed against grooved packing ring 29 will laterally expand and also longitudinally shift this ring, thereby correspondingly laterally expanding and longitudinally shifting the packing ring 28 so that the latter wedges against its cooperating seat 33. The rotatable elements 9—10 are thus tightly packed-off with relation to the kelly 2. In similar manner the casing pressure directed against the channeled packing 30 will laterally and longitudinally expand the same so as to tightly pack-off between the rotatable element 9 and the stationary element 8.

The packer 8—9—10 thus tightly packs-off the kelly 2, with this packing engagement automatically adjusted so as to maintain a tight seal in accordance with the casing pressure and irrespective of variations in said pressure; and the packer is in turn tightly packed-off with relation to body 3 by the locking elements 16 retaining the packer in wedging engagement with the tapering seat 5. The packing 12 at this tapering seat is preferably grooved as shown at 44, so that any seepage of pressure will automatically expand the packing for insuring a tight seal.

The packing of the blow-out preventer is thus automatically adjusted without requiring the operator to leave the derrick floor and enter the cellar in which the blow-out preventer is placed, and the locking elements 16 are preferably also operable from the derrick floor so that they may be released for removal of the blow-out preventer without requiring the immediate presence of the operator.

As an instance of this arrangement the locking elements 16 are slidable in radial slots 45 in the body 3, and a ring 46 is rotatable on the body for retracting or projecting the locking elements. A spring 47 normally rotates the ring in the direction for operatively projecting the locking elements so that they engage beneath shoulder 14 of the packer; and a flexible connection 48 extends to the derrick floor and is adapted to oppositely rotate the ring 46 for retracting the locking elements so that they disengage the shoulder 14 and thus permit removal of the packer from the body 3. For this purpose pins 49 project upwardly from the locking elements 16 and are received in cam slots 50 in the underside of ring 46, with the cam slots so positioned that when ring 46 is rotated by spring 47 in the direction indicated by arrow A in Fig. 1, the cam slots shift the pins 49 for operatively projecting the locking elements, while opposite rotation of ring 46 by a pull upon flexible connection 48 and as indicated by arrow B in Fig. 1, shifts the pins 49 to the outer ends of cam slots 50 so as to retract the locking elements 16 from their engagement beneath shoulder 14.

The invention thus provides a blow-out preventer of simple construction, but securely locked in place and providing a tight pack-off, with the locking means readily releasable from the derrick floor, and the packing elements operatively expanded in accordance with the casing pressure, and without requiring the presence of the operator for manually tightening the packing.

I claim:

1. Closure means adapted for mounting in well casing so as to surround a drill stem and including a rotatable element and a driving element, the rotatable element having a bore and the driving element being adapted for reception in said bore and adapted to turn with the drill stem, and a splined driving connection between the outer periphery of the driving element and the bore of the rotatable element adapted for ready engagement and disengagement merely by relative longitudinal movement of said elements.

2. Closure means adapted for mounting in well casing so as to surround a drill stem and including a rotatable element and a driving element, the rotatable element having a bore and the driving element being adapted for reception in said bore and adapted to turn with the drill stem, the outer periphery of the driving element and the bore of the rotatable element being of conforming non-circular cross-section forming a rotary driving connection between said elements adapted for engagement and disengagement by relative longitudinal movement of said elements, and means for locking the assembled elements against relative longitudinal displacement.

3. Closure means adapted for mounting in well casing so as to surround a drill stem and including a stationary element, a rotatable element journaled therein, and a driving element, the driving element being mounted on the drill stem and adapted to turn therewith, a driving connection between the driving element and the rotatable element adapted for engagement and disengagement by relative longitudinal movement of said elements, and means for locking said elements relative to the stationary element and against relative longitudinal movement.

4. Closure means adapted for mounting in well casing so as to surround a drill stem and including a rotatable element and a driving element, the rotatable element having a bore and the driving element being adapted for reception in said bore and adapted to turn with the drill stem, and the outer periphery of the driving element and the bore of the rotatable element being of conforming non-circular cross-section forming a rotary driving connection between said elements adapted for engagement and disengagement by relative longitudinal movement of said elements.

5. Closure means for a well casing including, a stationary body arranged to be mounted on a well casing, a non-rotatable member arranged for direct vertical movement into and out of said body, packing between the body and said member arranged to be expanded by pressure, a retractible latch mounted on the body and overhanging the member to retain the latter in said body, means for retracting said latch to permit free vertical movement of said member, a rotatable member confined within the non-rotatable member, and a packing in said rotatable member for engaging and packing off a drill pipe, whereby said members may be bodily raised from and lowered into said body by said drill pipe.

6. Closure means for a well casing including, a stationary outer body arranged to be mounted on a well casing and provided with a tapering seat, a removable non-rotatable member having its lower end reduced for engaging said seat, said non-rotatable member being arranged for vertical movement into and out of said body, a rotatable member journaled in the non-rotatable member and having packing engaging around a drill pipe and rotating therewith, laterally movable latches slidable in the body member and overhanging the non-rotatable member for latching the latter in the body, and means for actuating the latches including a spring, whereby the device may be latched and unlatched from a remote point and the members inserted in and removed from the body without the necessity of a workman going below the derrick floor.

7. Closure means for a well casing including, a stationary outer body arranged to be mounted on a well casing and provided with a tapering seat, a removable non-rotatable member having its lower end reduced for engaging said seat, said non-rotatable member being arranged for vertical movement into and out of said body, a rotatable member journaled in the non-rotatable member and having packing engaging around a drill pipe and rotating therewith, laterally movable latches slidable in the body member and overhanging the non-rotatable member for latching the latter in the body, means for actuating the latches including a spring, whereby the device may be latched and unlatched from a remote point and the members inserted in and removed from the body without the necessity of a workman going below the derrick floor, and packing interposed between the body and the non-rotatable member arranged to be expanded by the well pressure below the seat.

8. Closure means for a well casing including, a stationary outer body arranged to be mounted on a well casing and provided with a tapering seat, a removable non-rotatable member having its lower end reduced for engaging said seat, said non-rotatable member being arranged for vertical movement into and out of said body, a rotatable member journaled in the non-rotatable member and having packing engaging around a drill pipe and rotating therewith, laterally movable latches slidable in the body member and overhanging the non-rotatable member for latching the latter in the body, means operable from a remote point for withdrawing said latches to permit the non-rotatable and rotating members to be lifted bodily from the body, and spring means for moving said latches inwardly to latch said members in the body.

9. Closure means for a well casing including, a stationary outer body arranged to be mounted on a well casing and provided with a tapering seat, a removable non-rotatable member having its lower end reduced for engaging said seat, said non-rotatable member being arranged for vertical movement into and out of said body, a rotatable member journaled in the non-rotatable member and having packing engaging around a drill pipe and rotating therewith, laterally movable latches slidable in the body member and overhanging the non-rotatable member for latching the latter in the body, spring means for projecting said latches into latching position, and means for retracting the latches operable from a remote point, whereby the members may be released and raised from the body without the necessity of a workman going below the derrick floor.

10. In a drilling head, the combination of a body having a bore and arranged to be mounted on a well casing, a shell arranged for direct vertical movement into and out of said body, a rotatable member journaled in said shell, packing between the rotatable member and the shell exposed to and expanded by the well pressure below the shell and member, means in the member for packing off a drill pipe passing through said member, means for imparting rotation from a drill pipe to said rotatable member, a latch movably mounted on the body for overhanging the shell, and means operable from a remote point for actuating said latch, whereby said shell and member may be lowered into said body and latched and unlatched and raised vertically from said body without the necessity of a workman going below the derrick floor.

11. In a drilling head, the combination of a body having a bore and arranged to be mounted on a well casing, a shell arranged for direct vertical movement into and out of said body, a rotatable member journaled in said shell, packing between the rotatable member and the shell exposed to and expanded by the well pressure below the shell and member, means in the member for packing off a drill pipe passing through said member, means for imparting rotation from a drill pipe to said rotatable member, a latch movably mounted on the body for overhanging the shell, spring means for projecting said latch into latching position, and means for retracting the latch operable from a remote point, whereby the members may be released and raised from the body without the necessity of a workman going below the derrick floor.

12. In a drilling head, the combination of a body having a bore and arranged to be mounted on a well casing, a shell arranged for direct vertical movement into and out of said body, a rotatable member journaled in said shell, packing between the rotatable member and the shell exposed to and expanded by the well pressure below the shell and member, means in the member for packing off a drill pipe passing through said member, means for imparting rotation from a drill pipe to said rotatable member, a latch movably mounted on the body for overhanging the shell, means operable from a remote point for actuating said latch, whereby said shell and member may be lowered into said body and latched and unlatched and raised vertically from said body without the necessity of a workman going below the derrick floor, and a packing between the body and the shell arranged to be expanded by the well pressure.

JOHN W. MACCLATCHIE.